(12) United States Patent
Kiyohiro et al.

(10) Patent No.: US 11,569,767 B2
(45) Date of Patent: Jan. 31, 2023

(54) HYBRID-TYPE ENGINE GENERATOR OUTPUT CONTROLLER

(71) Applicant: Honda Motor Co., Ltd., Tokyo (JP)

(72) Inventors: Yukihiko Kiyohiro, Wako (JP); Taiyo Onodera, Wako (JP); Minoru Maedako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/042,167

(22) PCT Filed: Mar. 29, 2018

(86) PCT No.: PCT/JP2018/013448
§ 371 (c)(1),
(2) Date: Sep. 27, 2020

(87) PCT Pub. No.: WO2019/186961
PCT Pub. Date: Oct. 3, 2019

(65) Prior Publication Data
US 2021/0021218 A1   Jan. 21, 2021

(51) Int. Cl.
*H02P 9/04* (2006.01)
*H02P 101/25* (2016.01)

(52) U.S. Cl.
CPC ............ *H02P 9/04* (2013.01); *H02P 2101/25* (2015.01)

(58) Field of Classification Search
CPC ............................... H02P 9/04; H02P 2101/25
See application file for complete search history.

(56) References Cited

U.S. PATENT DOCUMENTS

| 4,738,330 | A | * | 4/1988 | Suzuki | ............ | B62D 5/07 |
| | | | | | | 60/443 |
| 5,445,014 | A | * | 8/1995 | Fiorenza, II | ............ | F02B 63/02 |
| | | | | | | 73/114.25 |
| 5,557,934 | A | * | 9/1996 | Beach | ............ | F01B 9/042 |
| | | | | | | 123/48 B |

(Continued)

FOREIGN PATENT DOCUMENTS

| JP | 2003244999 A | 8/2003 |
| JP | 2007006595 A | 1/2007 |

(Continued)

OTHER PUBLICATIONS

International Search Report; Application PCT/JP2018/013448; dated May 1, 2018.

*Primary Examiner* — Tulsidas C Patel
*Assistant Examiner* — Thomas K Quigley
(74) *Attorney, Agent, or Firm* — Duft & Bornsen, PC

(57) ABSTRACT

In an output control of a hybrid-type engine generator equipped with a load output demand detecting unit, a load output demand increase/decrease determination unit and an output control unit, a configuration is adopted whereby load output demand from (output required by) the load is detected, increase/decrease of the detected load output demand is determined, discharge power from the battery is added to generated power output of the engine generator unit when detected load output demand is determined to be increasing, and output of the engine generator unit is controlled so as to use some generated power output of the engine generator unit as charge power of the battery when detected load output demand is determined to be decreasing.

8 Claims, 5 Drawing Sheets

(56) References Cited

U.S. PATENT DOCUMENTS

| | | | | |
|---|---|---|---|---|
| 6,051,951 | A * | 4/2000 | Arai | H02P 9/30 |
| | | | | 318/700 |
| 6,414,400 | B1 * | 7/2002 | Scott | H02P 9/48 |
| | | | | 290/400 |
| 6,700,214 | B2 * | 3/2004 | Ulinski | H02J 7/1476 |
| | | | | 290/40 C |
| 8,731,732 | B2 * | 5/2014 | Klein | H02J 3/144 |
| | | | | 700/295 |
| 10,029,668 | B2 * | 7/2018 | Aikawa | B60W 10/06 |
| 10,174,671 | B2 * | 1/2019 | Ueno | F02B 39/10 |
| 10,833,616 | B1 * | 11/2020 | Silverstein | H02P 9/008 |
| 10,910,972 | B2 * | 2/2021 | Saito | B60L 1/00 |
| 2003/0144773 | A1 * | 7/2003 | Sumitomo | B60W 10/10 |
| | | | | 180/65.23 |
| 2011/0260546 | A1 * | 10/2011 | Hashizume | B60W 20/00 |
| | | | | 307/75 |
| 2016/0230680 | A1 * | 8/2016 | DeMarco | F02P 5/1504 |
| 2017/0184014 | A1 * | 6/2017 | Ueno | F02B 37/10 |
| 2020/0091847 | A1 * | 3/2020 | Saito | H02P 9/04 |

FOREIGN PATENT DOCUMENTS

| | | | |
|---|---|---|---|
| JP | 2011234458 | A | 11/2011 |
| JP | 2011256729 | A | 12/2011 |
| JP | 2013184642 | A | 9/2013 |

* cited by examiner

HYBRID-TYPE ENGINE GENERATOR OUTPUT CONTROLLER

TECHNICAL FIELD

This invention relates to an output controller of a hybrid-type engine generator that is driven by a battery and an engine and incorporates an engine generator unit.

BACKGROUND ART

Since an increase in load output demand from an engine generator causes engine speed to increase, it results in increased noise. Moreover, engine speed change due to a repetition of sudden load change results a repetition of increased/decreased noise, that is called "groan sound noise" or "engine rev-up sound". Such a noise makes listeners unpleasant. So the technology of Patent Document 1 was developed to inhibit such engine speed rise related to the hybrid-type engine generator.

The technology of Patent Document 1 is adapted on the one hand to respond to battery output being of predetermined value or greater by holding engine speed constant to generate fixed power output while simultaneously making up for any shortfall with battery output and on the other hand to respond to battery output having fallen below predetermined value by gradually increasing engine speed to gradually increase generated power output while simultaneously decreasing battery output.

PRIOR ART DOCUMENTS

Patent Document

Patent Document 1: Japanese Unexamined Patent Publication No. 2011-234458A

SUMMARY OF THE INVENTION

Problem to be Solved by the Invention

Patent Document 1 adopts the aforesaid configuration in order to avoid noise increase by inhibiting engine speed increase. The present invention is similarly directed to providing a hybrid-type engine generator output controller adapted to avoid noise increase by inhibiting engine speed increase.

Means for Solving the Problem

The invention provides an output controller of a hybrid-type engine generator equipped with a battery and an engine generator unit driven by the engine including: a load output demand detecting unit that detects a load output demand from a load; a load output demand increase/decrease determination unit that determines an increase/decrease of a required output power by the load output demand; and an output control unit that controls a first power converter so as to supply a discharge power from the battery along with a generated power of the engine generator unit to the load when the required output power is determined to be increasing and controls a second power converter so as to use a portion of the generated power of the engine generator unit as a charge power of the battery when the required output power is determined to be decreasing.

MODE FOR CARRYING OUT THE INVENTION

A hybrid-type engine generator output controller according to an embodiment of this invention is explained with reference to the attached drawings in the following.

Figure 1:
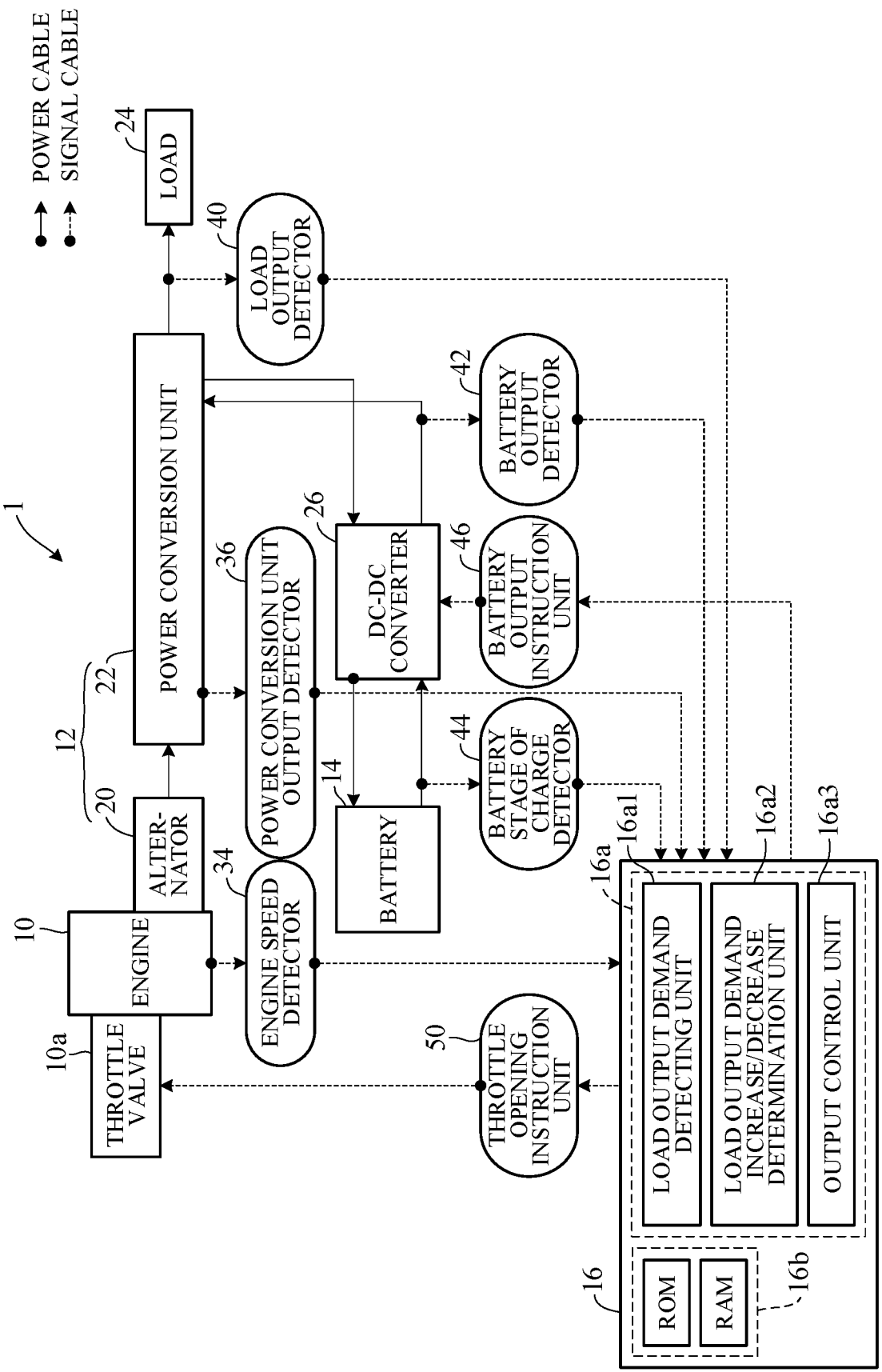
FIG. 1 is a schematic diagram generally illustrating a hybrid-type engine generator output controller according to an embodiment of this invention.
Figure 2:
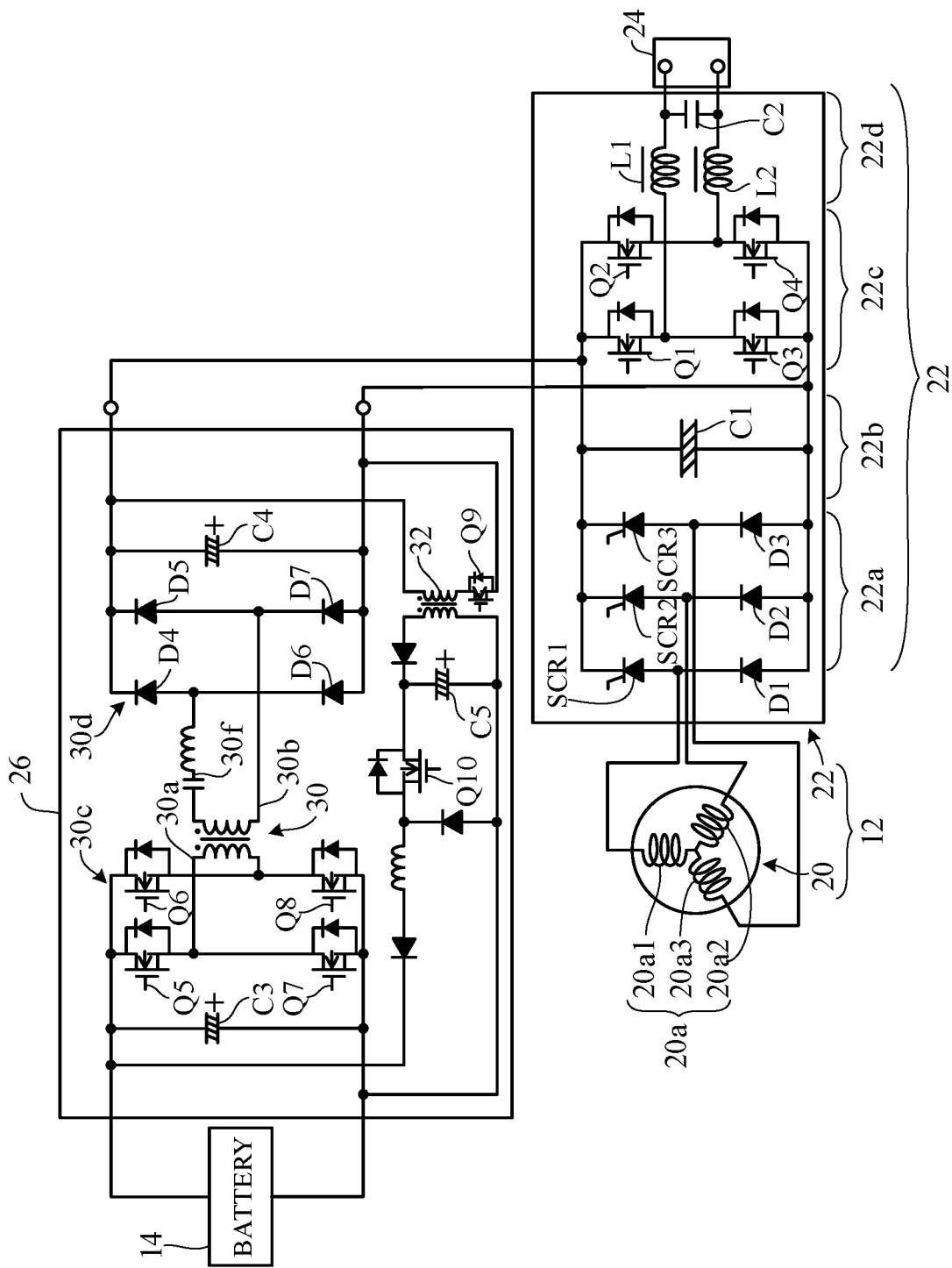
FIG. 2 is a circuit diagram showing structural details of an engine generator unit and other elements of FIG. 1.

FIG. 1 is a schematic diagram generally illustrating a hybrid-type engine generator output controller according to an embodiment of this invention, and FIG. 2 is a circuit diagram showing structural details of an engine generator unit and other elements of FIG. 1.

As shown in FIG. 1, a hybrid-type engine generator (hereinafter sometimes called "generator") 1 comprises an engine 10, an engine generator unit 12 driven by the engine 10, a battery 14, and an electronic control unit (hereinafter sometimes called "ECU") 16 that controls operation of these elements. The ECU 16 is a microcomputer including, inter alia, at least a processor (CPU) 16a and at least one memory (ROM, RAM) 16b connected to the processor 16a. The engine generator unit 12 is equipped with an alternator 20 and a power conversion unit 22.

The engine 10 is, for example, a spark ignition, air cooled, gasoline fueled engine with pistons (not shown) that reciprocate inside cylinders and a crankshaft (output shaft; not shown) that rotates synchronously with the pistons. Rotation of the engine 10 is regulated by a throttle valve 10a driven by an actuator.

Motive power of the engine 10 is transmitted through the crankshaft to drive the alternator 20 of the engine generator unit 12. The alternator 20, which is of multipolar type, comprises a rotor (not shown) that is connected to and rotated integrally with the crankshaft and is provided with permanent magnets therearound and a stator (not shown) that is arranged concentric with the rotor to face a peripheral surface thereof and is provided with UVW windings 20a arranged at phase angles of 120 degrees as shown in FIG. 2.

As shown in FIG. 2, the power conversion unit 22 comprises a rectifier 22a, a direct current unit 22b, an inverter 22c and a wave shaping circuit 22d.

The rectifier 22a is constituted of a hybrid bridge rectifier circuit comprising bridge connected thyristors SCR1, SCR2 and SCR3 and diodes D1, D2 and D3.

Among the three phase windings 20a of the alternator 20, U phase component 20a1 is connected to the junction between SCR1 and D1, V phase component 20a2 is connected to the junction between SCR2 and D2, and W phase component 20a3 is connected to the junction between SCR3 and D3.

The rectifier 22a rectifies output of the alternator 20 and sends the rectified output to the direct current unit 22b and also functions as drive means responsive to ON-OFF switching of SCR1 to SCR3 by the ECU 16 for converting DC output voltage from the battery 14 to three phase AC voltage applied to the alternator 20. The direct current unit 22b is formed by a capacitor C1.

The inverter 22c comprises bridge-connected switching elements Q1, Q2, Q3 and Q4 and diodes connected in parallel with the switching elements. Output of the inverter 22c is input to the wave shaping circuit 22d comprising coils L1 and L2 and a capacitor C2. The stage following the wave shaping circuit 22d is a load (electrical load) 24.

The battery 14 is connected to the power conversion unit 22 through an isolated DC-DC converter 26. The DC-DC converter 26 supplies power both ways between the battery 14 and the direct current unit 22b. The DC-DC converter 26 corresponds to the charging power converter and the output power converter indicated in FIG. 1.

The DC-DC converter 26 is equipped with a primary side low-voltage side winding 30a and a secondary side high-voltage side winding 30b of a transformer 30 and with a low-voltage side switching unit 30c connected to the low-voltage side winding 30a and a rectifier 30d connected to the high-voltage side winding 30b.

The low-voltage side switching unit 30c comprises bridge-connected switching elements Q5, Q6, Q7 and Q8 and diodes connected in parallel with the switching elements. The rectifier 30d comprises bridge-connected diodes D4, D5, D6 and D7.

The high-voltage side winding 30b incorporates an LC resonant circuit 30f and smoothing capacitors C3 and C4 are connected to the low-voltage side switching unit 30c and the rectifier 30d. Switching elements Q5 to Q8 of the low-voltage side switching unit 30c are ON-OFF controlled by the ECU 16.

A charging circuit is formed on input-output sides of a second transformer 32. The charging circuit comprises a switching element Q9 provided on input side of the second transformer 32 and a capacitor C5 and switching element Q10 provided on output side thereof. The ECU 16 ON-OFF controls the switching element Q9 to store DC voltage in the capacitor C5 and adjusts the stored voltage to a value suitable for charging the battery 14 by ON-OFF controlling the switching element Q10.

The ECU 16 synchronously drives the switching elements so that the DC-DC converter 26 performs power conversion in both directions.

In the illustrated configuration, therefore, when residual charge of the battery 14 is below predetermined value and generated power output of the engine generator unit 12 is adequate, output voltage of the direct current unit 22b is stepped up by the DC-DC converter 26 and input to the battery 14 (to charge the battery 14), while when residual charge of the battery 14 is high, output voltage of the direct current unit 22b augments (assists) output voltage of the engine generator unit 12, whereby power is supplied from the battery 14 to the load 24 via the DC-DC converter 26, the inverter 22c and the wave shaping circuit 22d.

In the power conversion unit 22, output voltage of the rectifier 22a is smoothed and adjusted by the direct current unit 22b, converted to AC power of predetermined frequency by the inverter 22c as elaborated later, and supplied to the load 24 through the wave shaping circuit 22d.

An engine speed detector 34 constituted of a magnetic pickup or the like provided in the engine 10, specifically near the stator of the alternator 20, detects rotational speed of the engine 10 commensurate with rotor rotational speed, and a power conversion unit output detector 36 constituted of a voltage-amperage sensor or the like provided in the power conversion unit 22 detects, inter alia, inter-terminal voltage of the capacitor C1 of the direct current unit 22b and generated power output of the engine generator unit 12.

A load output detector 40 constituted of a voltage-amperage sensor or the like provided upstream of the load 24 detects output required by the load 24.

A battery output detector 42 constituted of a voltage-amperage sensor or the like provided downstream of the DC-DC converter (output power converter) 26 detects power output (discharged) from the battery 14, and a battery state of charge detector 44 constituted of a voltage-amperage sensor or the like suitably installed at the battery 14 detects state of charge (SOC) of the battery 14.

Moreover, a battery output instruction unit 46 that instructs output (discharge) of the battery 14 is provided in the DC-DC converter (output power converter) 26.

An actuator of the throttle valve 10a of the engine 10 is connected to a throttle opening instruction unit 50 and opening-closing of throttle valve 10a is adjusted to correct throttle opening by driving the actuator in accordance with output of the throttle opening instruction unit 50.

Outputs of the aforesaid detectors are inputted to the ECU 16. The ECU 16 controls inter-terminal voltage of the capacitor C1 detected in the engine generator unit 12 to constant value irrespective of increase-decrease of load 24 and ON-OFF controls the switching elements Q5 to Q8 so that AC power output from the inverter 22c matches load output demand from (output required by) the load 24 at desired frequency.

Based on the received sensor outputs, the ECU 16 also operates through the battery output instruction unit 46 to instruct battery 14 output (discharge) and operates through the throttle opening instruction unit 50 to adjust throttle opening and control engine speed.

Moreover, as discussed later, the processor 16a in the ECU 16 operates in accordance with a program stored in the memory 16b to function as a load output demand detecting unit 16a1 that detects load output demand from (output required by) the load 24, a load output demand increase/decrease determination unit 16a2 that determines increase/decrease of detected load output demand and an output control unit 16a3 that controls on the one hand to add discharge power from the battery 14 to generated power output of the engine generator unit 12 when detected load output demand is determined to be increasing and controls on the other hand output of the engine generator unit 12 so as to use some generated power output of the engine generator unit 12 as charge power of the battery 14 when detected load output demand is determined to be decreasing. In other words, a configuration is adopted whereby load output demand from (output required by) the load 24 is detected, increase/decrease of the detected load output demand is determined, discharge power from the battery 14 is added to generated power output of the engine generator unit 12 when detected load output demand is determined to be increasing, and output of the engine generator unit 12 is controlled so as to use some generated power output of the engine generator unit 12 as charge power of the battery 14 when detected load output demand is determined to be decreasing.

Figure 3:
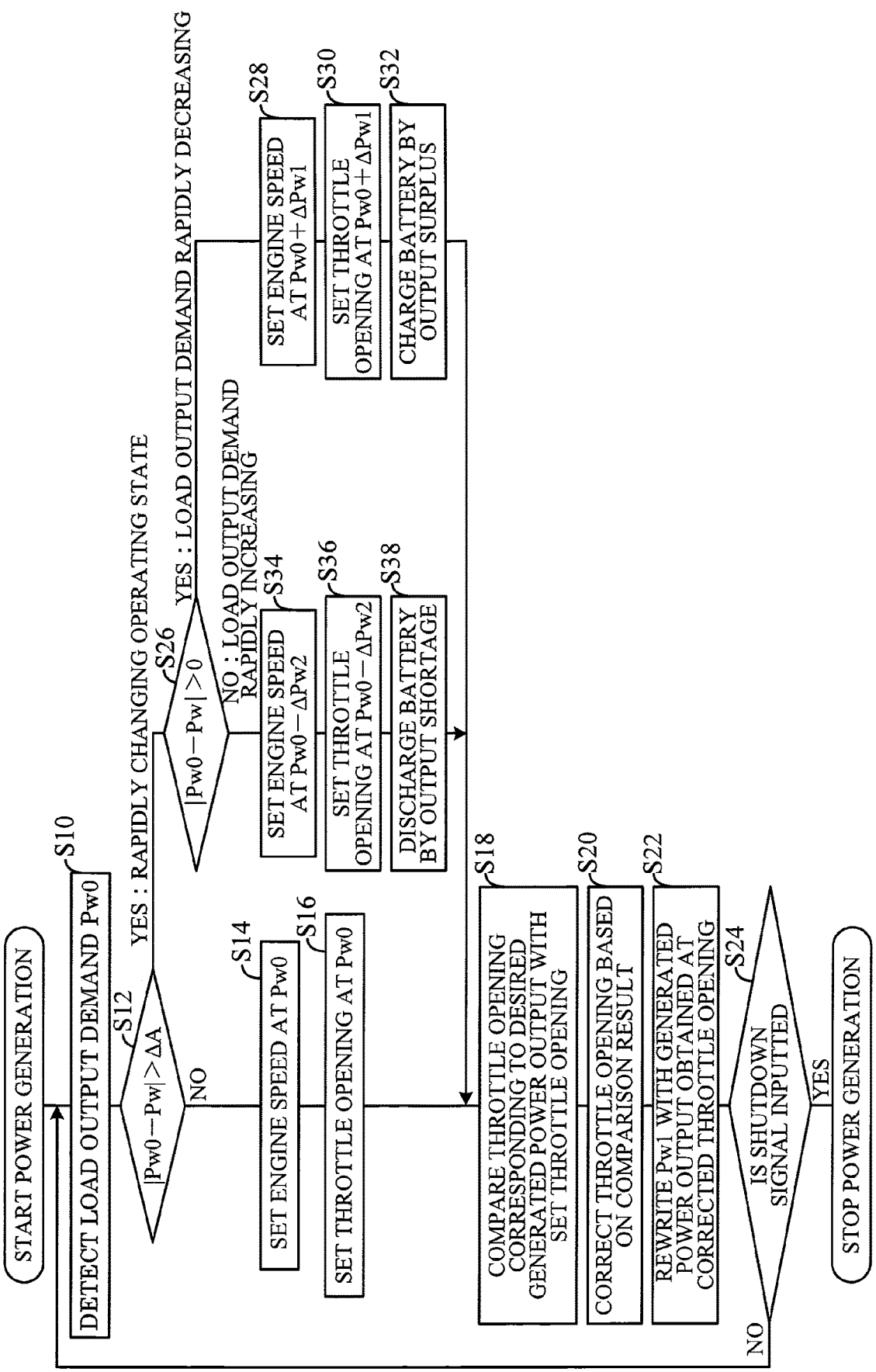
FIG. 3 is a flowchart showing operation of the engine generator output controller of FIG. 1.

FIG. 3 is a flowchart showing actions of the output controller of the engine generator 1 according to this embodiment, specifically actions of the ECU 16. The illustrated program is executed at predetermined time intervals t (e.g., every 10 msec).

Now to explain with reference to FIG. 3, the illustrated processing starts when power generation commences. First, in S10, load output demand Pw0 is detected. This is performed by detecting output of the load output detector 40. (S: processing Step)

Next, in S12, the detected load output demand Pw0 is compared with current generated power output Pw1 of the engine generator unit 12 (namely, with value detected from output of the power conversion unit output detection unit 36 at preceding program execution time t−1) to calculate absolute difference therebetween, and it is determined whether the calculated difference exceeds predetermined value $\Delta A$. Predetermined value $\Delta A$ is defined as a value calculated to be sufficient for determining rapid increase/decrease of detected load output demand.

When the result in S12 is NO, load output demand is judged not to be in a rapidly increasing or decreasing state but in a normal operating state, so the program goes to S14 to set engine speed needed to meet load output demand and to S16 to set corresponding throttle opening.

Next, in S18, throttle opening corresponding to desired generated power output for meeting load output demand detected in S10 is calculated from an appropriate characteristic curve and compared with the set throttle opening. Next, in S20, the throttle opening set by means of the throttle opening instruction unit 50 in S16 is corrected based on the comparison result.

Next, in S22, current generated power output Pw1 is rewritten with generated power output obtained at throttle opening corrected in S20. Therefore, in the comparison of S12 in the next program loop, the value rewritten in S22 is used.

Next, in S24, it is determined whether a shutdown signal was input. When the result is NO, the program returns to S10 to continue the foregoing processing, and when YES, operation (power generation) is terminated.

On the other hand, when the result in S12 is YES, i.e., when detected load output demand is judged to be in a rapidly changing operating state, the program goes to S26 to determine whether difference obtained by subtracting current generated power output Pw1 from load output demand Pw0 is less than zero, i.e., whether detected load output demand is rapidly decreasing.

When the result in S26 is YES, the program goes to S28, in which engine speed decrease suppression $\Delta Pw1$ is added to load output demand Pw0 and the sum obtained is used to retrieve corresponding engine speed from a characteristic curve.

Engine speed decrease suppression $\Delta Pw$ can be set to same value as the difference calculated between load output demand Pw0 and current generated power output Pw1 or be set to a value selected from among multiple values associated with the calculated difference beforehand.

Next, in S30, throttle opening satisfying set engine speed is set. Next, in S32, difference between generated power output calculated from throttle opening set in S30 and detected load output demand is deemed output surplus and used as charge power of the battery 14, whereafter the program goes to S18.

When engine speed decrease suppression $\Delta Pw1$ is set to the same value as the difference between load output demand Pw0 and generated power output Pw1 in S28, surplus output becomes equal to engine speed decrease suppression.

On the other hand, when the result in S26 is NO, the program goes to S34, in which engine speed corresponding to the difference obtained by subtracting engine speed increase suppression $\Delta Pw2$ from load output demand Pw0 is set by retrieval from an appropriate characteristic curve.

Engine speed increase suppression $\Delta Pw2$ can also be similarly set to the same value as the difference calculated between load output demand Pw0 and current generated power output Pw1 or be set to a value selected from among multiple values prepared beforehand based on the calculated difference.

The program goes to S36 to set throttle opening satisfying set engine speed and to S38, in which difference between generated power output calculated from throttle opening set in S36 and detected load output demand is deemed output shortage and corresponding discharge power from the battery 14 is added to generated power output of the engine generator unit 12 (shortage is covered by battery discharge), whereafter the program goes to S18.

Actual discharge and charge of the battery 14 in S38 and S32 is performed by controlling operation of the DC-DC converter 26 by means of the ECU 16, more exactly the output controller 16a3.

Similarly, when engine speed increase suppression $\Delta Pw2$ is set to the same value as the difference between load output demand Pw0 and current generated power output Pw1 in S34, output shortage becomes equal to engine speed decrease suppression.

Figure 4:
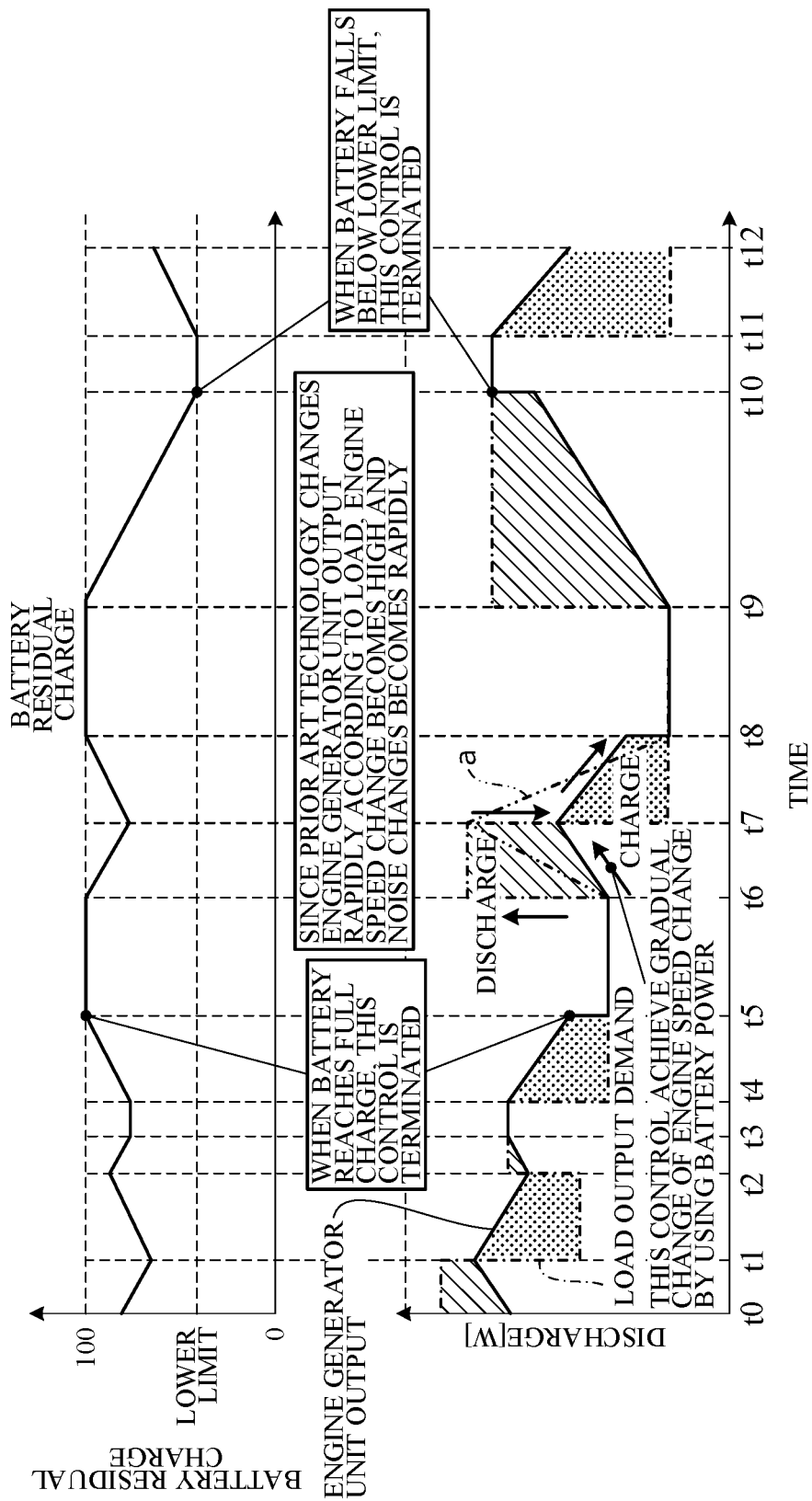
FIG. 4 is a time chart for explaining the processing of FIG. 3 flowchart.

FIG. 4 is a time chart for explaining the processing of the flowchart of FIG. 3.

In FIG. 4, one-dot-dashed line represents load output demand and solid line represents output of the engine generator unit 12 subject to main control according to this embodiment. In FIG. 4, residual charge of the battery 14 is expressed as ratio (%) relative to fully charged state of the battery 14.

When increase of load output demand is detected at time to, generated power output is increased up to time t1 commensurate with load output demand increase and shortage relative to load output demand is covered by discharge power from the battery 14.

Upon detection at time t1 that load output demand has started to decrease, generated power output is decreased up to time t2 commensurate with load output demand decrease and surplus relative to load output demand is used as charge power of the battery 14.

The aforesaid processing is also repeated with respect to increase/decrease of load output demand after time t3. When the battery 14 reaches full charge at time t5, or when residual charge of the battery 14 falls below lower limit value at time t10, this control is terminated.

Figure 5:
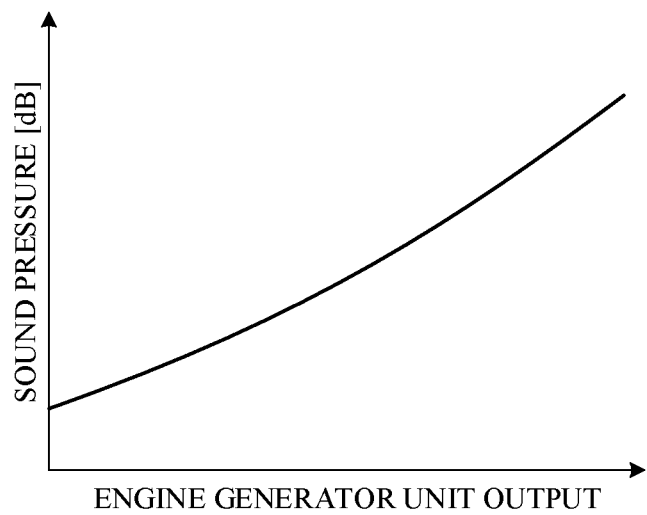
FIG. 5 is an explanatory diagram showing sound pressure (noise) characteristics with respect to output of the engine generator unit.

FIG. 5 is an explanatory diagram showing sound pressure (noise) [dB] characteristics with respect to output of the engine generator unit 12. As indicated, noise increases with increasing output of the engine generator unit 12.

Figure 6:
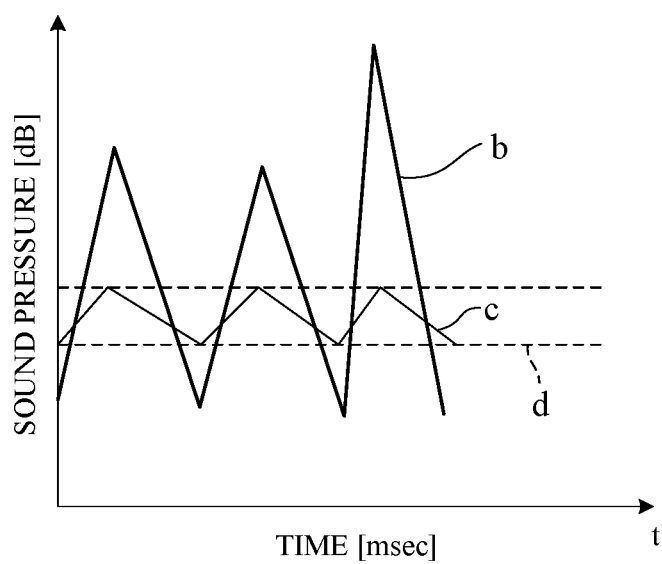
FIG. 6 is an explanatory diagram showing sound pressure rise/fall on an infinitesimal time scale.

FIG. 6 is an explanatory diagram showing sound pressure rise and fall on an infinitesimal time [msec] scale. When sound pressure rises and falls within infinitesimal periods as indicated, it is perceived as annoying noise by humans.

As regards this point, since prior art technologies set engine generator unit output as a function of load output demand, engine generator unit output becomes the same as load output demand in FIG. 4. For example, as shown by double-dot chain line a between time t6 and t8, engine speed becomes high and noise increases.

In contrast, in this embodiment since output of the engine generator unit 12 is set by adding engine speed decrease suppression $\Delta Pw1$ to load output demand Pw0 or by subtracting engine speed increase suppression $\Delta Pw2$ from load output demand Pw0, output of the engine generator unit 12 becomes as indicated by solid line.

In other words, as shown in the drawing, this embodiment can smoothly achieve gradual change of engine speed by using power of the battery 14 to control output of the engine generator unit 12, so that increase of unpleasant noise can be avoided by minimizing rapid increase/decrease of engine speed.

More specifically, as seen in FIG. 6, sound pressure is not rapidly changed as in the case of the prior art indicated by symbol b but can be gradually changed within the range of symbol d as indicated by symbol c, so that unpleasant noise can be avoided by minimizing rapid increase/decrease of engine speed.

As described in the foregoing, this embodiment is configured such that, the output controller of the hybrid-type engine generator 1 equipped with the battery 14 and the engine generator unit 12 driven by the engine 10 comprises: the load output demand detecting unit (16a1, 40, S10) that detects load output demand from (output required by) the load 24; the load output demand increase/decrease determination unit (16a2, S12, S26) that determines increase/decrease of the required output power by the load output demand; and the output control unit (16a3, S14 to S38) that controls on the one hand the first power converter (output power converter) so as to supply discharge power from the battery along with generated power of the engine generator unit to the load when the required output power by the load output demand is determined to be increasing and controls on the other hand the second power converter (charging power converter) so as to use a portion of the generated power of the engine generator unit as charge power of the battery when the required output power by the load output demand is determined to be decreasing, by which configuration smooth and gradual change of engine speed can be achieved by using power of the battery 14 to control output of the engine generator unit 12 and thereby avoid increase of noise by minimizing rapid increase/decrease of engine speed.

Moreover, the output control unit is configured on the one hand to subtract engine speed increase suppression from generated power of the engine generator unit when the required output power by the load output demand is determined to be increasing to calculate difference therebetween (S34) and on the other hand to add engine speed decrease suppression to generated power of the engine generator unit when the required output power by the load output demand is determined to be decreasing to calculate a sum thereof (S28), whereby discharge power or charge power of the battery is set based on the calculated difference or sum (S36, S38, S30, S32) and output of the engine generator unit 12 is controlled accordingly (S18 to S22), which configuration enables effective smoothing of engine speed, thereby ensuring still more effective avoidance of noise increase.

In addition, the output control unit is configured to calculate the engine speed increase suppression and the engine speed decrease suppression based on the difference between the required output power by the load output demand and the generated power of the engine generator unit (S34, S28), so that, in addition to realizing the aforesaid effects, calculation of suppression of engine speed increase/decrease is facilitated.

Moreover, the output control unit is configured to perform the output control when increase/decrease of the detected load output demand is determined to be within predetermined range (S12, S26), so that, in addition to realizing the aforesaid effects, suppression of engine speed increase/decrease can be kept within necessary range.

As described in the foregoing, this embodiment is configured such that, the output control method of the hybrid-type engine generator 1 equipped with the battery 14 and the engine generator unit 12 driven by the engine 10 comprises: the load output demand detecting step (S10) that detects load output demand from (output required by) the load 24; the load output demand increase/decrease determination step (S12, S26) that determines increase/decrease of the required output power by the load output demand; and the output control step (S14 to S38) that controls on the one hand the first power converter (output power converter) so as to supply discharge power from the battery along with generated power of the engine generator unit to the load when the required output power by the load output demand is determined to be increasing and controls on the other hand the second power converter (charging power converter) so as to use a portion of the generated power of the engine generator unit as charge power of the battery when the required output power by the load output demand is determined to be decreasing, by which configuration smooth and gradual change of engine speed can be achieved by using power of the battery 14 to control output of the engine generator unit 12 and thereby avoid increase of noise by minimizing rapid increase/decrease of engine speed.

Moreover, the output control step is configured on the one hand to subtract engine speed increase suppression from generated power of the engine generator unit when the required output power by the load output demand is determined to be increasing to calculate the difference therebetween (S34) and on the other hand to add engine speed decrease suppression to generated power of the engine generator unit when the required output power by the load output demand is determined to be decreasing so as to calculate a sum thereof (S28), whereby discharge power or charge power of the battery is set based on the calculated difference or sum (S36, S38, S30, S32) and output of the engine generator unit 12 is controlled accordingly (S18 to S22), which configuration enables effective smoothing of engine speed, thereby ensuring still more effective avoidance of noise increase.

In addition, the output control step is configured to calculate the engine speed increase suppression and the engine speed decrease suppression based on the difference between the required output power by the load output demand and the generated power output of the engine generator unit (S34, S28), so that, in addition to realizing the aforesaid effects, calculation of suppression of engine speed increase/decrease is facilitated.

Moreover, the output control step is configured to perform the output control when increase/decrease of the detected load output demand is determined to be within predetermined range (S12, S26), so that, in addition to realizing the aforesaid effects, suppression of engine speed increase/decrease can be kept within necessary range.

As described in the foregoing, this embodiment is configured such that, the output controller of the hybrid-type engine generator 1 equipped with the battery 14 and the engine generator unit 12 driven by the engine 10, comprises: the ECU 16 including, inter alia, at least a processor 16a and at least one memory 16b connected to the processor 16a so that the processor 16a in the ECU 16 operates in accordance with a program stored in the memory 16b to function to detect load output demand from (output required by) the load 24 (16a1, S10); to determine increase/decrease of the required output power by the load output demand (16a2, S12, S26); and to control on the one hand the first power converter (output power converter) so as to supply discharge power from the battery along with generated power of the engine generator unit to the load when the required output power by the load output demand is determined to be increasing and controls on the other hand the second power converter (charging power converter) so as to use a portion of the generated power of the engine generator unit as charge power of the battery when the required output power by the load output demand is determined to be decreasing (16a3, S14 to S38) that, by which configuration smooth and gradual change of engine speed can be achieved by using power of the battery 14 to control output of the engine generator unit 12 and thereby avoid increase of noise by minimizing rapid increase/decrease of engine speed.

Moreover, the processor 16a is configured on the one hand to subtract engine speed increase suppression from generated power of the engine generator unit when the required output power by the load output demand is determined to be increasing so as to calculate the difference therebetween (S34) and on the other hand to add engine speed decrease suppression to generated power of the engine generator unit when the required output power by the load output demand is determined to be decreasing so as to calculate a sum thereof (S28), whereby discharge power or charge power of the battery is set based on the calculated difference or sum (S36, S38, S30, S32) and output of the engine generator unit 12 is controlled accordingly (S18 to S22), which configuration enables effective smoothing of engine speed, thereby ensuring still more effective avoidance of noise increase.

In addition, the processor 16a is configured to calculate the engine speed increase suppression and the engine speed decrease suppression based on difference between the required output power by the load output demand and the generated power output of the engine generator unit (S34, S28), so that, in addition to realizing the aforesaid effects, calculation of suppression of engine speed increase/decrease is facilitated.

Moreover, the processor 16a is configured to perform the output control when increase/decrease of the detected load output demand is determined to be within predetermined range (S12, S26), so that, in addition to realizing the aforesaid effects, suppression of engine speed increase/decrease can be kept within necessary range.

INDUSTRIAL APPLICABILITY

The inverter generator controller according to this invention can be optimally utilized in power generators driven by an engine.

DESCRIPTION OF SYMBOLS 1 engine generator, 10 engine, 14 battery, 16 electronic control unit (ECU), 16a processor, 16a1 load output command detecting unit, 16a2 load output demand increase/decrease determination unit, 16a3 output control unit, 16b memory, 20 alternator, 22 power conversion unit, 22a rectifier, 22b direct current unit, 22c inverter, 22d wave shaping circuit, 24 load, 26 DC-DC converter, 30 transformer, 32 second transformer, 34 engine speed detector, 36 power conversion unit output detector, 40 load output detector, 42 battery output detector, 44 battery stage of charge detector, 46 battery output instruction unit, 50 throttle opening instruction unit

The invention claimed is:

1. An output controller of a hybrid-type engine generator equipped with a battery and an engine generator unit each configured to output power to a load, the output controller comprising:
   a load output detector that detects a load output demand from the load; and
   an electronic control unit having a microprocessor and a memory connected to the microprocessor, the microprocessor is configured to perform processing at time intervals to:
     compare the load output demand at a present time interval with a power output of the engine generator unit driven by an engine operating at an engine speed set for a prior time interval to determine whether a difference between the load output demand and the power output exceeds a predetermined value;
     when the difference between the load output demand and the power output does not exceed the predetermined value:
       set the engine speed of the engine for the present time interval to meet the load output demand; and
       set a throttle opening for the engine based on the engine speed set to meet the load output demand;
     when the difference between the load output demand and the power output exceeds the predetermined value:
       determine whether the load output demand is increasing or decreasing with respect to the prior time interval;
     when the load output demand is determined to be increasing:
       set the engine speed of the engine for the present time interval based on a difference between the load output demand and an engine speed suppression value; and
       set the throttle opening for the engine based on the engine speed determined based on the difference between the load output demand and the engine speed suppression value.

2. The output controller according to claim 1, wherein the microprocessor is further configured to perform processing to:
   when the load output demand is determined to be decreasing:
     set the engine speed of the engine for the present time interval based on a sum of the load output demand and the engine speed suppression value; and
     set the throttle opening for the engine based on the engine speed determined based on the sum of the load output demand and the engine speed suppression value.

3. The output controller according to claim 2, wherein:
   a difference between the load output demand and the power output of the engine generator unit with the engine speed set based on the sum of the load output demand and the engine speed suppression value comprises an output surplus used as charge power of the battery.

4. The output controller according to claim 1, wherein:
   a difference between the load output demand and the power output of the engine generator unit with the engine speed set based on the difference between the load output demand and the engine speed suppression value comprises an output shortage supplemented with discharge power from the battery.

5. A method of operating an output controller of a hybrid-type engine generator equipped with a battery and an engine generator unit each configured to output power to a load, the method performed at time intervals and comprising:
   detecting a load output demand from the load for a present time interval;
   comparing the load output demand at the present time interval with a power output of the engine generator unit driven by an engine operating at an engine speed set for a prior time interval to determine whether a difference between the load output demand and the power output exceeds a predetermined value;
   when the difference between the load output demand and the power output does not exceed the predetermined value:
      setting the engine speed of the engine for the present time interval to meet the load output demand; and
      setting a throttle opening for the engine based on the engine speed set to meet the load output demand;
   when the difference between the load output demand and the power output exceeds the predetermined value:
      determining whether the load output demand is increasing or decreasing with respect to the prior time interval;
   when the load output demand is determined to be increasing:
      setting the engine speed of the engine for the present time interval based on a difference between the load output demand and an engine speed suppression value; and
      setting the throttle opening for the engine based on the engine speed determined based on the difference between the load output demand and the engine speed suppression value.

6. The method according to claim 5, further comprising:
   when the load output demand is determined to be decreasing:
      setting the engine speed of the engine for the present time interval based on a sum of the load output demand and the engine speed suppression value; and
      setting the throttle opening for the engine based on the engine speed determined based on the sum of the load output demand and the engine speed suppression value.

7. The method according to claim 6, wherein:
   a difference between the load output demand and the power output of the engine generator unit with the engine speed set based on the sum of the load output demand and the engine speed suppression value comprises an output surplus used as charge power of the battery.

8. The method according to claim 5, wherein:
   a difference between the load output demand and the power output of the engine generator unit with the engine speed set based on the difference between the load output demand and the engine speed suppression value comprises an output shortage supplemented with discharge power from the battery.

\* \* \* \* \*